United States Patent
Edelstein et al.

(10) Patent No.: US 9,632,826 B2
(45) Date of Patent: *Apr. 25, 2017

(54) PRIORITIZING DEFERRED TASKS IN PENDING TASK QUEUE BASED ON CREATION TIMESTAMP

(71) Applicant: INTERNATIONAL BUSINESS MACHINES CORPORATION, Armonk, NY (US)

(72) Inventors: Ron Edelstein, Tel Aviv (IL); Yariv Bachar, Tel Aviv (IL); Oded Sonin, Tel Aviv (IL)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 68 days.

This patent is subject to a terminal disclaimer.

(21) Appl. No.: 14/619,019

(22) Filed: Feb. 10, 2015

(65) Prior Publication Data

US 2015/0154050 A1 Jun. 4, 2015

Related U.S. Application Data

(63) Continuation of application No. 14/072,553, filed on Nov. 5, 2013, now Pat. No. 8,959,527, which is a continuation of application No. 13/489,374, filed on Jun. 5, 2012, now Pat. No. 8,954,985.

(51) Int. Cl.
| | | |
|---|---|---|
| G06F 9/48 | (2006.01) | |
| G06F 9/52 | (2006.01) | |
| G06F 9/54 | (2006.01) | |
| G06F 9/46 | (2006.01) | |
| G06F 9/44 | (2006.01) | |

(52) U.S. Cl.
CPC .............. *G06F 9/4881* (2013.01); *G06F 9/52* (2013.01); *G06F 9/546* (2013.01); *G06F 9/44* (2013.01); *G06F 9/46* (2013.01)

(58) Field of Classification Search
CPC .......... G06F 9/4881; G06F 9/52; G06F 9/546; G06F 9/44; G06F 9/46
See application file for complete search history.

(56) References Cited

U.S. PATENT DOCUMENTS

| | | | |
|---|---|---|---|
| 4,980,824 A | 12/1990 | Tulpule et al. | |
| 6,230,243 B1 | 5/2001 | Elko et al. | |
| 6,269,079 B1 | 7/2001 | Marin et al. | |
| 6,411,982 B2* | 6/2002 | Williams | G06F 9/4881 718/102 |
| 7,127,446 B1 | 10/2006 | Menezes et al. | |
| 7,395,529 B1* | 7/2008 | Stanton | G06F 8/71 717/131 |
| 7,793,299 B2* | 9/2010 | Howland | G06F 9/4825 710/200 |
| 8,495,261 B2* | 7/2013 | Rogers | G06F 13/24 370/216 |

(Continued)

*Primary Examiner* — Benjamin Wu
(74) *Attorney, Agent, or Firm* — Griffiths & Seaton PLLC

(57) ABSTRACT

A task is marked as dependent upon a preceding task. The task that is attempted to be taken for execution from a head of a pending task queue that is marked is deferred. The deferred task is removed from the pending task queue and placed in a deferred task queue. The deferred task is reinserted back into the pending task queue for execution upon determining that the preceding tasks are completed.

14 Claims, 6 Drawing Sheets

(56) References Cited

U.S. PATENT DOCUMENTS

| | | | |
|---|---|---|---|
| 8,549,536 B2 | 10/2013 | Vasil et al. | |
| 9,262,215 B2* | 2/2016 | Bachar | G06F 9/4881 |
| 9,286,106 B1* | 3/2016 | Huang | G06F 9/46 |
| 2002/0078186 A1* | 6/2002 | Engel | G06F 8/61 |
| | | | 709/220 |
| 2002/0114340 A1 | 8/2002 | Kumazawa et al. | |
| 2003/0037091 A1* | 2/2003 | Nishimura | G06F 9/4881 |
| | | | 718/103 |
| 2007/0156786 A1* | 7/2007 | May | G06F 11/3476 |
| 2009/0083755 A1 | 3/2009 | Luo | |
| 2010/0281487 A1 | 11/2010 | Schneider et al. | |
| 2010/0333109 A1 | 12/2010 | Milnor | |
| 2011/0289503 A1 | 11/2011 | Toub et al. | |

\* cited by examiner

PRIORITIZING DEFERRED TASKS IN PENDING TASK QUEUE BASED ON CREATION TIMESTAMP

CROSS REFERENCE TO RELATED APPLICATIONS

This application is a Continuation of U.S. patent application Ser. No. 14/072,553, filed on Nov. 5, 2013, which is a Continuation of U.S. patent application Ser. No. 13/489,374, now U.S. Pat. No. 8,954,985, filed on Jun. 5, 2012, both of which are incorporated herein by reference.

FIELD OF THE INVENTION

The present invention relates generally to computers, and more particularly, to dependency management in task scheduling.

DESCRIPTION OF THE RELATED ART

In today's society, computer systems are commonplace. Computer systems may be found in the workplace, at home, or at school. Computer systems may include data storage systems, or disk storage systems, to process and store data. Within various computing environments, computer systems are generally required to multi-task, meaning that the computer systems can handle a number of different tasks or processes at the same time. Additionally, the various tasks and processes to be completed may each have a different relative priority based on a number of different factors. Due to these various factors, challenges arise for increasing the efficiency of the dependency management in task scheduling within the computing environment.

SUMMARY OF THE INVENTION

Given that computer systems are required to multi-task, a scheduling system is responsible for allocating resources of the computing system to perform the scheduled tasks. However, tasks that are dependent upon preceding tasks generate challenges to the task scheduling operations. Tasks are deferred until all preceding tasks (dependent or non-dependent) finish executing. As such, a need arises for deferring execution of tasks dependent on preceding tasks within a task queue and maintaining a constant time complexity attribute without compromising the queuing order between two dependent or two non-dependent tasks.

Accordingly, and in view of the foregoing, various exemplary method, system, and computer program product embodiments for dependency management in task scheduling in a computing environment are provided. In one embodiment, by way of example only, a task is marked as dependent upon a preceding task. The task that is attempted to be taken for execution from a head of a pending task queue that is marked is deferred. The deferred task is removed from the pending task queue and placed in a deferred task queue. The deferred task is reinserted back into the pending task queue for execution upon determining that the preceding tasks are completed.

In one embodiment, a system and computer program product provide for dependency management in task scheduling in a computing environment. The system and computer program product provide for at least one processor device operable in the computing environment, wherein the at least one processor device is adapted for: receiving tasks and labeling each ask with a creation stamp; placing each task at the end of a pending task queue, wherein the pending task queue is sorted according to the creation stamp for each task; marking a task in the pending task queue as dependent upon preceding tasks, deferring the task that is marked and attempted to be taken for execution from a head of the pending task queue by placing it in a deferred task queue if the task that is marked cannot be taken for execution, acquiring the deferred task from the deferred task queue and determining if the deferred task may be taken for execution by: determining if a creation stamp of a preceding task that is at the head of the pending task queue is greater than the creation stamp of the deferred task that is marked, and reinserting the deferred task back into the head of the pending task queue for execution upon determining that the preceding tasks are completed.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
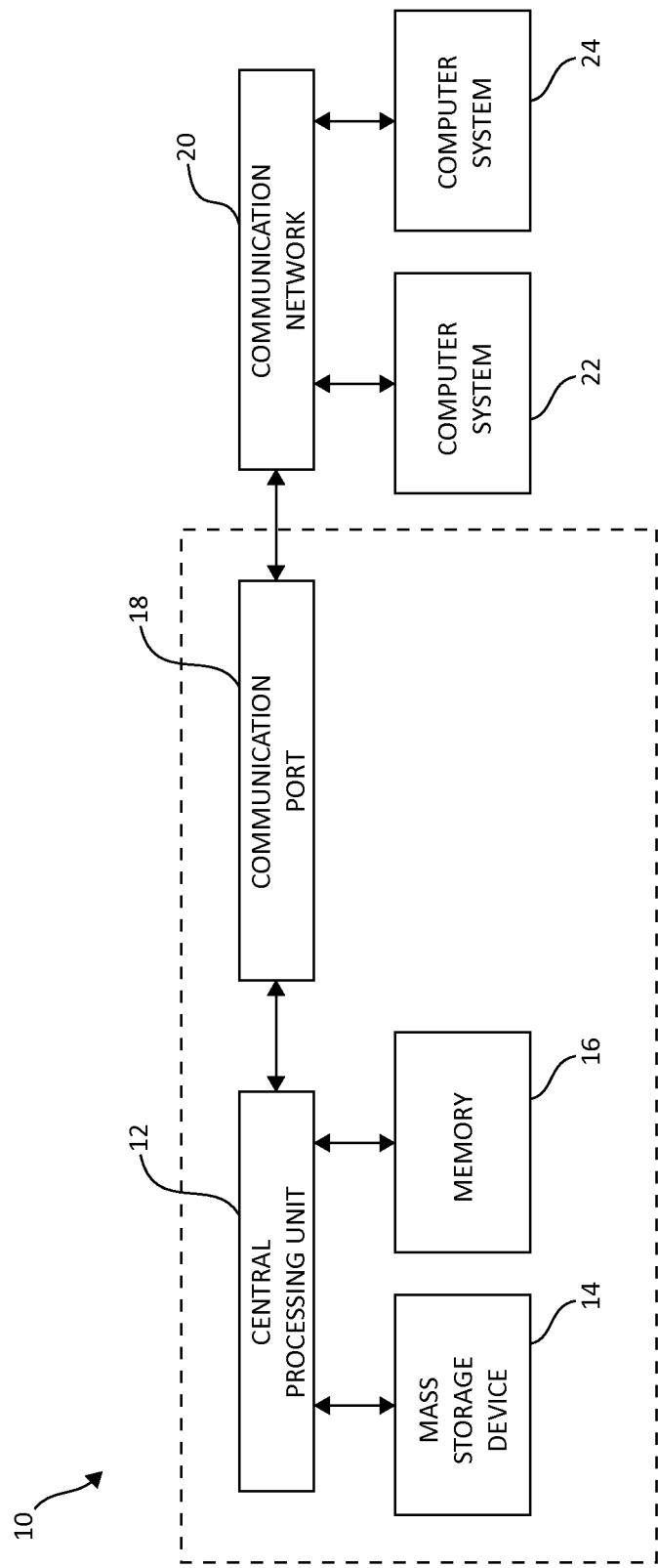
FIG. 1 is a block diagram illustrating a computing system environment having an example storage device in which aspects of the present invention may be realized.

Throughout the following description and claimed subject matter, the following terminology, pertaining to the illustrated embodiments, is described. A "Pending Task Queue" is intended to refer to a queue that holds the tasks that are pending execution. The pending task queue is assumed to be fair, meaning the queue maintains a "first come first serve" policy for scheduling. A "Deferred Task Queue" is intended to refer to a queue that holds tasks for which execution is deferred until the tasks dependencies are met (e.g., finished executing). The deferred task queue is assumed to be fair, meaning the queue maintains a "first come first serve" policy for scheduling. A "Running Task List" is intended to refer to a list of running triggers. A "task record" is intended to refer to an entity describing a task. Task records are stored in both the pending task queue and in the running task list. A "Task Execution" is intended to refer to the operation of using data encapsulated in the task record by a processing procedure. The task execution process involves moving a task from the pending task queue to the running task list. A "Preceding Task" is intended to refer to a task (e.g. task "A") that precedes another task (e.g., task "B") if task "A" was created (and added to a pending task queue) before task "B". A "Task Deferral" is intended to refer to the act of preventing a queued task from being taken for execution by the dispatcher until all of the tasks that preceded it complete their execution. A "Maximum Number of Running Tasks" is intended to refer to the maximum number of tasks the system may execute simultaneously. This is the maximum size of the running task list. A "Creation Stamp" is intended to refer to a task attribute based on a monotonic non-decreasing function. Each newly created task will receive a creation stamp of the current system. A "Task Returning" is intended to refer to the process of removing a running task from the running task list and placing the removed task back in the pending task queue. The returning of a task is performed if the task execution ended with a retry request (e.g. if the execution of the task could not be completed for some reason). A "Task Regaining" is intended to refer to the process of removing a deferred task from the deferred task queue and putting it back in the pending task queue. The regaining of a task is performed when the scheduling mechanism determines that the deferred task may be taken for execution. A "system" may include a computer system, a computer processor, a primary storage system, a remote storage system or any other component within a computer environment needed to carry out the claimed invention.

As mentioned above, a scheduling system is responsible for allocating resources to scheduled tasks. A dispatcher is responsible for de-queuing tasks from a task queue and assists in allocating the appropriate resources to the tasks. A task selection process by the dispatcher may vary within various computing systems, and may be defined as a scheduling algorithm. A long term scheduling system may be a scheduling system in which task execution may be deferred until system resources are available. The deferred tasks must be kept in a queue, which in some systems must be kept in a persistent state. A task may be dependent on the completion of previous tasks (e.g., the task must not be taken for execution until all of the tasks that preceded the dependent task have completed execution). The management process of such dependencies may entail a performance penalty on the system as the dependent tasks need to be postponed while other non-dependent tasks are taken for execution. Such processes involve computational penalties of retrieving postponed tasks and manipulating the queuing data structure. Moreover, in the case of persistent computing systems, additional penalties of load and save (e.g. I/O operations on physical storage devices) are incurred. Thus, in order for a computing system to maintain a constant time complexity dependency management in task scheduling, the computing system must satisfy the following essential requirements. It should be noted that constant time complexity means the time required to perform an operation is not dependent upon the number of tasks in the queue. (1) The dependency management must support dependency of a subset of the tasks on preceding tasks within the task queue. (2) The dependency management must allow for constant time complexity (e.g., managing and handling the dependent tasks should not entail searching the entire task queue). (3) The dependency management shall not compromise the queuing order between non-dependent tasks nor the queuing order between dependent tasks. In other words, the queuing scheme may only be affected in cases in which one of the tasks is dependent and the other task is non-dependent. (4) The dependency management shall support retrying of tasks, if needed. In other words, the mechanisms support scheduling systems that optionally return tasks to the queue after execution. Also, the computing system should provide support for persistent task queues (and associated data structures) due to the constant-time complexity the computing system provides.

To address these needs, the mechanisms of the illustrated embodiments seek to provide a solution allowing for constant time complexity dependency management in task scheduling, satisfying all requirements described above. The mechanisms enable dependency of a subset of tasks on previous tasks within the task queue that are within constant time complexity. The mechanisms allow for constant time complexity dependency management in task scheduling without compromising the queuing order between two dependent and/or two non-dependent tasks. In other words, the mechanisms of the illustrated embodiments provide a solution by satisfying the required elements, as stated above, for allowing constant time complexity dependency management in task scheduling according to the following requirements. 1) The mechanisms support dependency of a subset of the tasks on preceding tasks within the task queue. 2) The mechanisms allow dependency management operations to have constant time complexity (e.g., handling dependent tasks may not entail searching an entire task queue). 3) The mechanisms do not compromise the queuing order between non-dependent tasks nor the queuing order between dependent tasks. In other words, the queuing scheme may only be affected in cases in which one of the tasks is dependent and the other is not. 4) The mechanisms support task retrying. In one embodiment, the mechanisms support scheduling systems that optionally return tasks to the queue after execution and provide support for persistent task queues (and associated data structures) due to the constant-time complexity.

In one embodiment, the mechanisms of the illustrated embodiment enable the task scheduling within the basic framework of repeatedly removing a next task record (e.g., the next schedule task waiting for execution) from a pending task queue, placing the task record in a running task list, and executing the task record. When the task execution successfully completes, the task record is removed from the running task list. Alternatively, a task execution may end with a retry request in which the task record is removed from the running task list and returned to the head of the pending task queue in order to be retried. Moreover, the mechanisms preserve the original order of the pending task queue when returning the task record to the head of the pending task queue. In so doing, the mechanisms of the illustrated embodiments allow dependent tasks queued for execution to be deferred until all of the tasks that preceded the dependent tasks complete their execution.

In one embodiment, by way of example only, tasks may either be dependent or non-dependent on preceding tasks. One of the attributes of a newly created task is an indication as to whether or not the task is dependent on preceding tasks associated with the new task (e.g., whether or not the execution of the task must be deferred until all preceding tasks complete their execution. Each task may be "marked" as a task that is dependent upon all preceding tasks. A task that is not marked as dependent on preceding tasks may be taken for execution, without any constraints, other than those imposed by a pending task queuing mechanism. In other words, when a non-dependent task is removed from the pending task queue, the non-dependent task may be immediately taken for execution. However, when a task that is marked as dependent on preceding tasks is removed from the pending task queue, the mechanisms of the illustrated embodiments verify that all of the tasks that preceded the dependent task have completed execution. If one of the preceding tasks of the marked task has yet to be completed, the dependent task is deferred until the deferred task may be taken for execution. The deferred task is removed from a pending task queue, and thus, a next task in the queue may be taken for execution.

After removing the deferred tasks from the pending task queue, the deferred task records may be placed in a designated queue (e.g., a deferred task queue) until the deferred task records (e.g., "deferred tasks) may finally be taken for execution. The ordering of the tasks in the deferred task queue is identical to the order of the tasks in the pending task queue (e.g., the pending task queue and the deferred task queue are assumed to be fair). A task is removed from the deferred task queue once all preceding tasks associated with the task have completed execution. The deferred task is then removed from the deferred task queue and placed at the head of the pending task queue in order to be taken for execution.

In order to achieve constant time complexity, the mechanisms allow for determining whether or not each preceding task associated with the deferred task(s) has completed execution within a constant time. Moreover, the mechanisms further allow for determining whether a deferred task may be returned to the pending task queue. Also, the mechanisms of the illustrated embodiment only require the scanning of a running task list, which has an upper bound threshold constant (e.g., the maximum number of tasks that the system may execute simultaneously), since the ordering of the tasks in the pending task queue and the deferred task queue are identical. The scanning of the running task list allows the mechanism to eliminate the need for scanning all pending and deferred tasks.

In addition, since deferred task records are removed from the pending task list, the mechanisms do not compromise the order between two non-dependent tasks. The mechanisms also maintain the order between two dependent tasks, since the deferred tasks are placed in the deferred task queue and are only returned to the pending task list once the task(s) are conclusively taken for execution. Furthermore, retried tasks (e.g., tasks that are returned to the pending task queue from a running list) do not compromise the dependency between two dependent tasks, because the original order of the pending task queue is preserved.

Hence, the mechanisms of the illustrated embodiments achieve constant complexity dependency mechanism in task scheduling, by satisfying the following comprehensive set of requirements. 1) The marking of tasks by the mechanisms as dependent on preceding tasks enables creating a subset of tasks, for which execution may be deferred until the complete execution of all preceding tasks. (2) The deferral of task operations by the mechanisms of the illustrated embodiments relies on scanning a running list, which is bounded by a well-known constant. Thus, deferring tasks and determining whether a deferred task may be taken for execution is performed in constant time complexity, without scanning all pending and deferred tasks. (3) Removing the deferred tasks from the pending queue and placing them in a designated queue ensures that the mechanisms will not compromise the queuing order between two dependent tasks and also between two non-dependent tasks. (4) Since the order of the pending task queue is preserved when a task is retried, the proposed mechanism supports task retrying.

Turning now to FIG. 1, exemplary architecture 10 of a computing system environment is depicted. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and 22 and storage systems, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 24 and 22. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Figure 2:
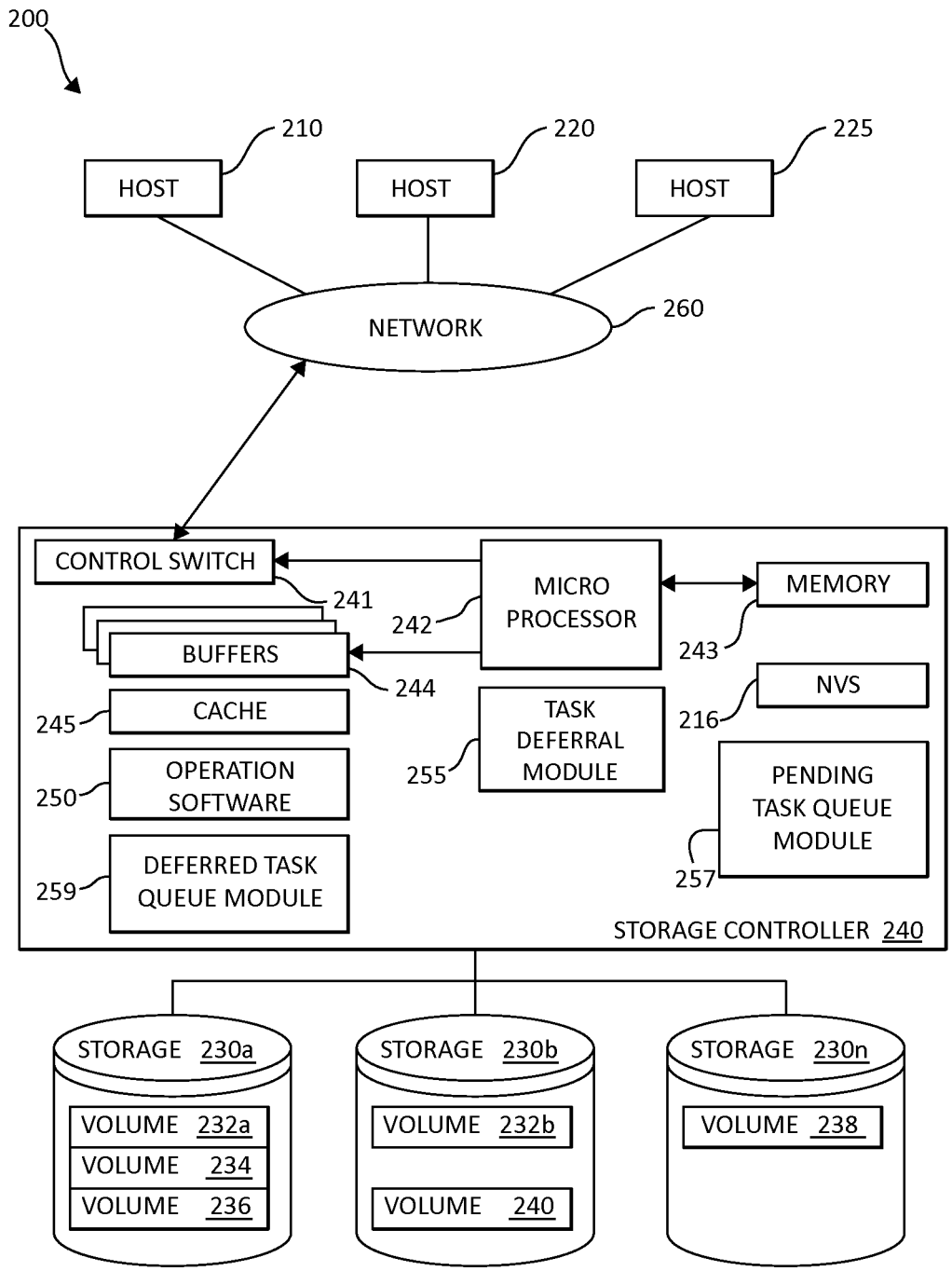
FIG. 2 is a block diagram illustrating a hardware structure of an exemplary data storage system in a computer system in which aspects of the present invention may be realized.

FIG. 2 is an exemplary block diagram 200 showing a hardware structure of a data storage system in a computer system according to the present invention. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. In one embodiment, by way of example only, a data storage system 200 may be implemented as IBM® System Storage™ DS8000™. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adapter 260 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Storage 230 (labeled as 230a, 230b, and 230n in FIG. 3) may be comprised of one or more storage devices, such as storage arrays, which are connected to storage controller 240 (by a storage network) with one or more cluster hosts 210, 220, and 225 connected to each storage controller 240.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps of the present invention for executing and managing storage 230 as described herein. In one embodiment, system memory 243 includes, is in association with, or is in communication with the operation software 250 for performing methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a task deferral module 255, a pending task queue module 257, and a deferred task queue module 259. The task deferral module 255, the pending task queue module 257, and the deferred task queue module 259 may work in conjunction with each and every component of the storage controller 240, the hosts 210, 220, 225, and storage devices 230. The task deferral module 255, the pending task queue module 257, and the deferred task queue module 259 may be structurally one complete module or may be associated and/or included with other individual modules. The task deferral module 255, the pending task queue module 257, and the deferred task queue module 259 may also be located in the cache 245 or other components.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control and each table described later, cache 245 for temporarily storing (buffering) data, and buffers 244 for assisting the cache 245 to read and write data, a control switch 241 for controlling a protocol to control data transfer to or from the storage devices 230, task deferral module 255, the pending task queue module 257, and the deferred task queue module 259, in which information may be set. Multiple buffers 244 may be implemented with the present invention to assist with the operations as described herein. In one embodiment, the cluster hosts/nodes, 210, 220, 225 and the storage controller 240 are connected through a network adaptor (this could be a fibre channel) 260 as an interface i.e., via at least one switch called "fabric."

In one embodiment, the host computers or one or more physical or virtual devices, 210, 220, 225 and the storage controller 240 are connected through a network adaptor (this could be a fibre channel) 260 as an interface i.e., via at least one switch called "fabric." In one embodiment, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, task deferral module 255, the pending task queue module 257, and the deferred task queue module 259 are in communication with each other and may be separate or one individual component(s). Also, several, if not all of the components, such as the operation software 250 may be included with the memory 243. Each of the components within the devices shown may be linked together and may be in communication with each other for purposes suited to the present invention.

As mentioned above, the task deferral module 255, the pending task queue module 257, and the deferred task queue module 259 may also be located in the cache 245 or other components. It should be noted that the RAM module 259 can be compared to short-term memory and the hard disk to the long-term memory. In other words, the RAM module 259 is random access memory. The RAM (random access memory) is the place in a computer where the operating system, application programs, and data in current use are kept so that they can be quickly reached by the computer's processor 242. The RAM is much faster to read from and write to than the other kinds of storage in a computer, the hard disk, floppy disk, and CD-ROM. As such, one or more task deferral module 255, the pending task queue module 257, and the deferred task queue module 259 maybe used as needed, based upon the storage architecture and users' preferences.

Figure 3:
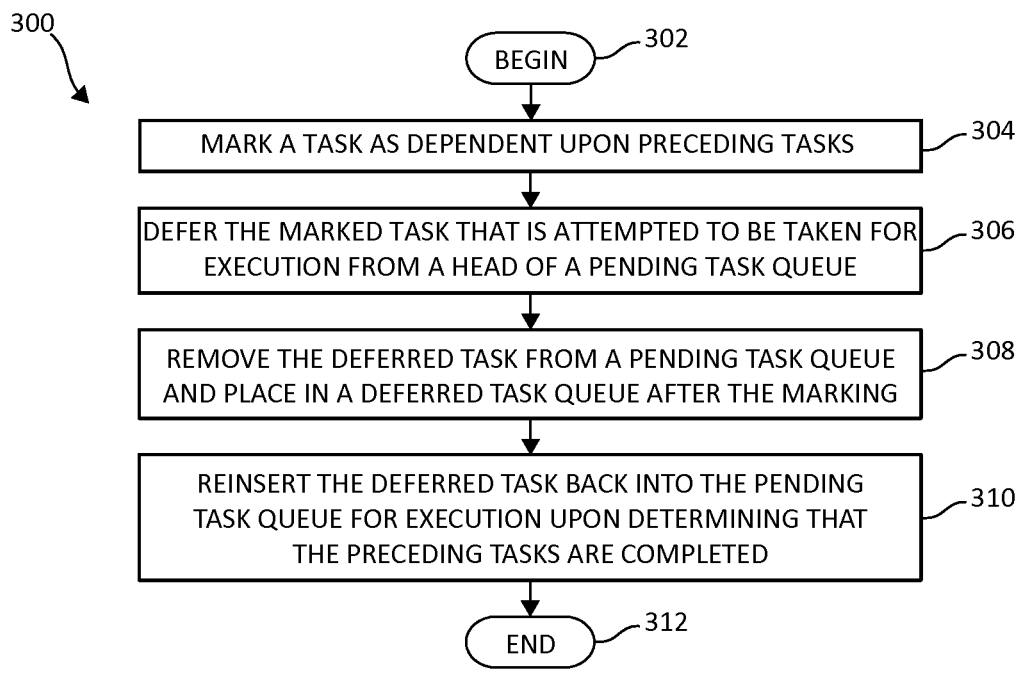
FIG. 3 is a flow chart diagram illustrating an exemplary method for dependency management in task scheduling.

Turning now to FIG. 3, a flowchart illustrating an exemplary method 300 for dependency management in task scheduling, is illustrated. The method 300 begins (step 302) by marking a task as dependent upon preceding tasks (step 304). The method 300 may defer the marked task when the marked tasks is attempted to be taken for execution from a head of a pending task queue (step 306). It should be noted that all deferred tasks are dependent tasks, but dependent tasks may not be deferred tasks. A dependent task may be deferred if the dependent task, when needing to be taken for execution, the mechanisms identifies that one or more of the dependent task dependencies are not yet met (i.e. all of the preceding tasks have not finished executing). Only at this time will the task be deferred.

The deferred task is removed from a pending task queue and placed in a deferred task queue (step 308). The deferred task is reinserted back into the pending task queue for execution upon determining that the preceding tasks is completed (step 310). It should be noted that the tasks are retuned back to the pending task queue in a way that preserves the pending task queue's original order. In other words, the tasks are retuned back to the pending task queue according to the creation stamp of the tasks. The method 300 ends (step 312).

To assist with deferring a task for execution by marking the deferred task as dependent upon preceding tasks, the mechanisms of the illustrated embodiments use a non-decreasing function to label each new task with a creation stamp. The mechanisms use the non-decreasing (monotonic) function over time to generate the creation stamp. In such a function f, if time "$T_1$" is greater than time "$T_2$" (e.g., $T_1 > T_2$), then the function $f(T_1)$ is greater than or equal to $f(T_2)$ (e.g., $f(T_1) \geq f(T_2)$), where f is the function, $T_1$ is a first time and $T_2$ is a second time period. Hence, the creation stamps generated will never decrease over time and the task records in the pending task queue will be sorted according to the assigned creation stamp for each task. This order is an invariant of the pending task queue, and the scheduling mechanism ensures that the invariant is preserved.

In order to preserve this invariant, only new tasks may be placed at the end of the pending task queue. Existing tasks that need to be returned to the pending task queue, either from the deferred queue (regaining) or from the running list (returning), are always placed at the head of the pending task queue, in a manner that will keep the queue sorted (e.g., an insertion sort). Such an insertion sort does not compromise the constant-time complexity requirement of the mechanism.

Also, since the task creation stamp is non-decreasing, determining if a task depends on preceding tasks may be taken for execution may be reduced to determining if a task with a smaller creation stamp exists in either the pending task queue or in the running task list. This is achieved in constant time because the sorted pending task queue allows for comparing only the first element in the pending task queue and because the maximum size of the running list is bounded by a constant threshold, which is the maximum number of running tasks.

The following description of the mechanisms illustrate how the sorting of the tasks in the pending task queue does not compromise the constant-time complexity requirement. First, a task is regained from the deferred task queue and returned to the pending task queue only if there are no existing tasks with a smaller creation stamp in either the pending task queue or the running list. Specifically, the creation stamp of the deferred task is less than the creation stamp of the first task in the pending task queue. Thus, the deferred task may be placed at the head of the pending task queue without the need for performing an insertion sort operation. Second, if a task is returned from the running task list back to the pending task queue, the depth of the insertion queue of the returned task into the pending task queue (e.g., the order in which the task is placed back into the pending task queue) is at most equal to the amount of the maximum number of running tasks, since tasks are always returned to the head of the queue. Because the maximum number of running tasks number is constant, the insertion sort operation of the returned task has constant time complexity.

As will be described below in FIG. 4, the mechanisms illustrate an exemplary method for getting the next task for execution. First, the mechanisms try to regain a deferred task from the deferred task queue. The mechanisms then remove the next task record from the pending task queue. The task record is now checked to determine whether or not the next task is dependent on any preceding tasks. If the task is not dependent on any preceding tasks, the task record is placed in the running task list and the task is executed. If the task is dependent on preceding tasks, the mechanisms determine whether or not it can be taken for execution. If the task can be taken for execution, the task record is placed in the running task list and the task is executed. Otherwise, if the task may not be taken for execution the task is deferred and the task record is placed at the tail of the deferred task queue.

Figure 4:
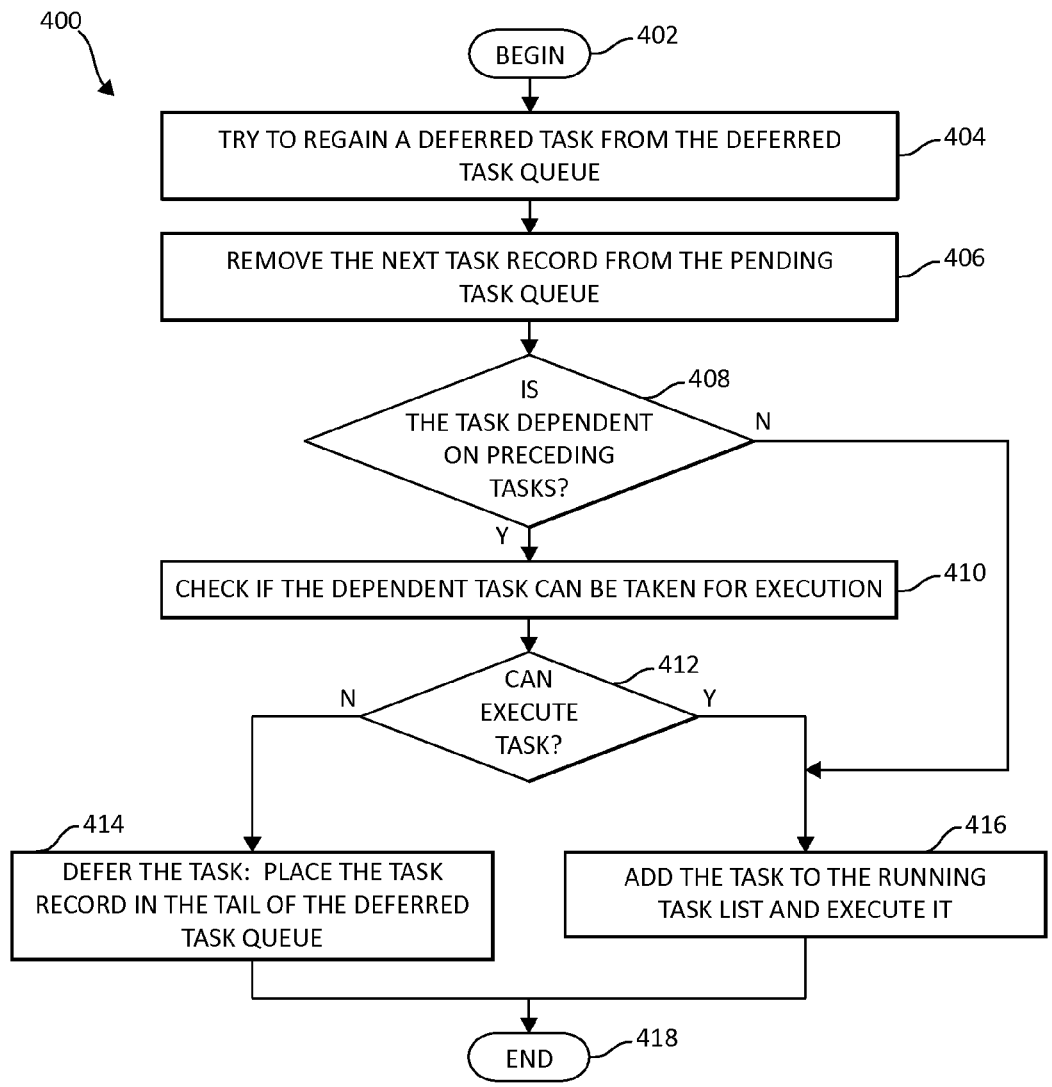
FIG. 4 is a flow chart diagram illustrating an exemplary method for obtaining a task for execution.

The procedure for obtaining a task for execution is hereby described by turning now to FIG. 4. FIG. 4 is a flowchart illustrating an exemplary method 400 for obtaining a task for execution. The method 400 begins (step 402) by attempting to regain (e.g., acquire) a deferred task from a deferred task queue (step 404). The method 400 may remove the next task record (e.g., the next schedule task waiting for execution) from a pending task queue (step 406). The method 400 may then determine if the next task in the pending task queue is dependent upon any preceding tasks (step 408). If no, the method 400 may add the task to a running task list and execute the task (step 416). If yes, the method 400 may check if the dependent task may be taken for execution (step 410) and determine if the task may be executed (step 412). If the task may be executed, the method 400 may add the task to a running task list and execute the task (step 416). The method 400 ends (step 418). If the task may not be executed, the method 400 may defer the task for execution by placing the task record at the end of the deferred task queue (step 414), and, once again, the method 400 ends (step 418).

As will be described below in FIG. 5, the mechanisms illustrate an exemplary embodiment for trying to regain a deferred task. The mechanisms start by checking if there are any deferred tasks in a deferred task queue (e.g., determining whether or not a deferred task queue is empty). If there are deferred tasks, the first deferred task record in the deferred task queue is retrieved from the deferred task queue. The mechanisms determine if the deferred task may be taken for execution (e.g., determining whether or not each of preceding tasks associated with the deferred task has finished execution). If a deferred task may be taken for execution, it is regained, i.e. the task record is placed at the head of the pending task queue, so that the regained task will be the next task to be taken for execution in the pending task queue. If the deferred task may not be taken for execution yet, the task record of the deferred task is returned to the head of the deferred task queue. The procedure for regaining a deferred task is hereby described by turning now to FIG. 5.

Figure 5:
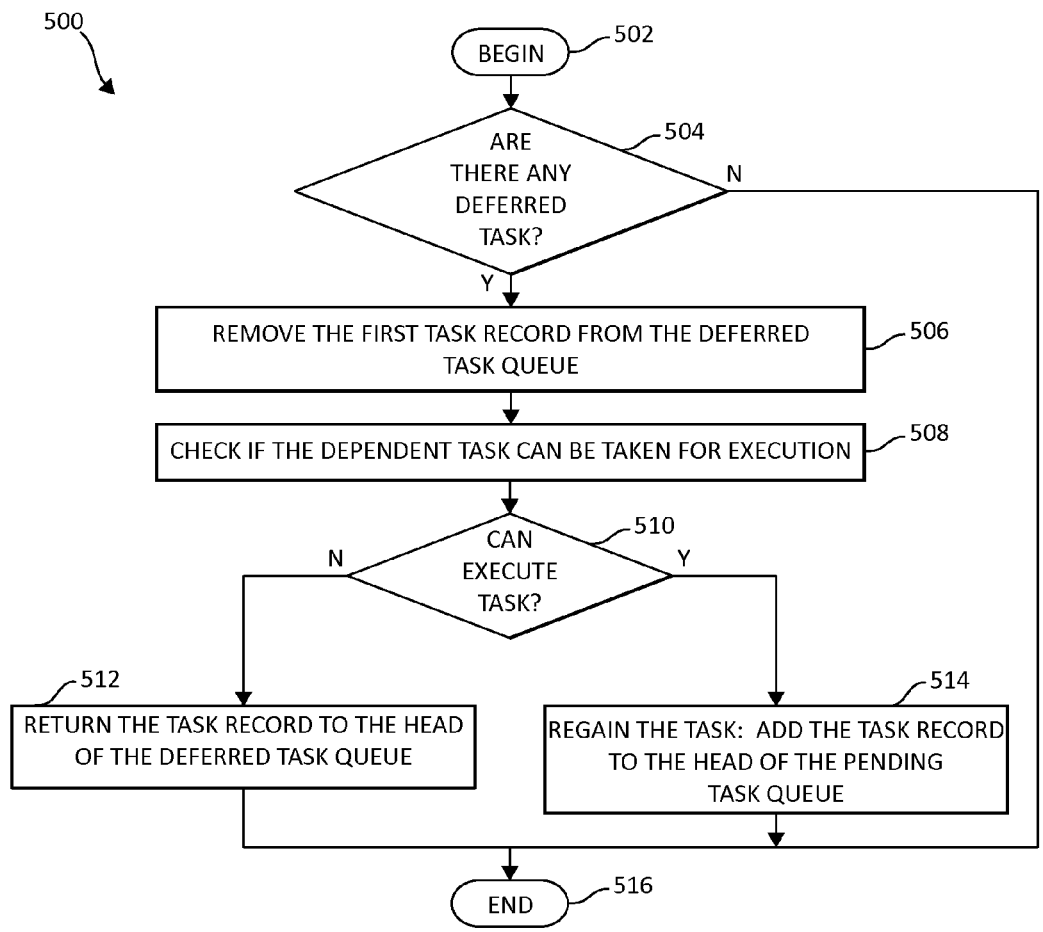
FIG. 5 is a flow chart diagram illustrating an exemplary method for regaining a deferred task from a deferred task queue.

FIG. 5 is a flowchart illustrating an exemplary method 400 for regaining a deferred task from a deferred task queue. The method 500 begins (step 502) by determining if there are any deferred tasks in a deferred task queue (step 504). If no, the method 500 ends (step 516). If yes, the method 500 removes the first task record from the deferred task queue (step 506). The method 500 checks if the dependent task may be taken for execution (step 508) and determines if the method 500 may execute the task (step 510). If no, the method 500 returns the task record to the head of the deferred task queue (step 512). If yes, the method 500 regains (e.g., acquires) the task from the deferred task queue and adds the task record to the head of the pending task queue (step 514). The method 500 ends (step 516).

As described above in FIG. 5 (step 508), the mechanisms check if the dependent task may be taken for execution. To assist with the checking operation, in one embodiment, the mechanisms first check whether or not the creation stamp of the deferred task is smaller or equal to that of the first task in the pending task queue. This comparison to creation stamps is sufficient for the regaining of the deferred task from the deferred task queue because the pending task queue has been sorted according to the creation stamps. If the creation stamp of the deferred tasks is not less than or equal to that of the first task in the pending task queue, the dependent task may not be taken for execution yet. In other words, preceding tasks associated with the deferred task have not finished execution. However, if the creation stamp of the deferred task is less than or equal to that of the first task in the pending task queue, the mechanisms also determines if the smallest creation stamp of a task in the running tasks list is smaller than or equal to the creation stamp of the deferred task. Moreover, obtaining the minimal creation stamp (e.g. the smallest creation stamp) may be accomplished in constant time complexity since the running task list is bound by the maximum number of running tasks. If the smallest creation stamp of the task in the running tasks list is smaller than or equal to the creation stamp of the deferred task, then the dependent task cannot be taken for execution. If the smallest creation stamp of the task in the running tasks list is greater than the creation stamp of the deferred task, then the dependent task may be taken for execution.

Figure 6:
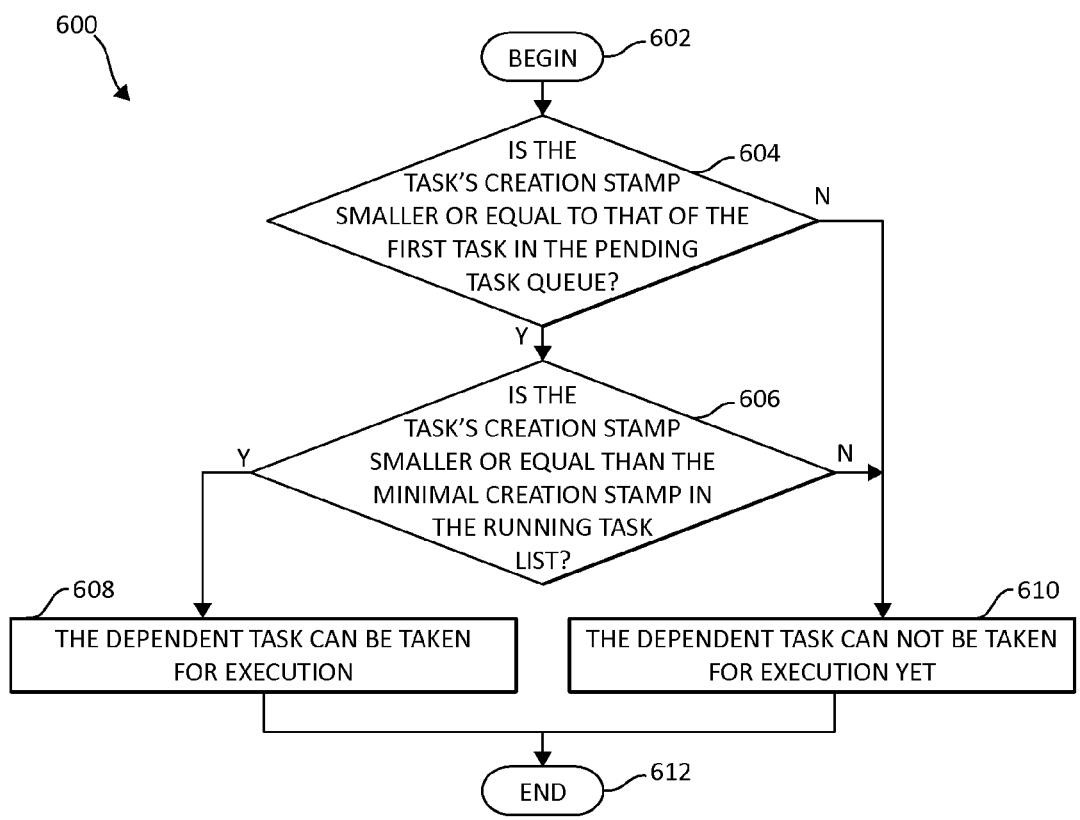
FIG. 6 is a flow chart diagram illustrating an exemplary method for determining if a dependent task may be executed.

The procedure for checking if a dependent task may be executed is hereby described by turning now to FIG. 6. FIG. 6 is a flowchart illustrating an exemplary method 600 for determining if a dependent task (e.g., deferred task) may be executed. The method 600 begins (step 602) by determining if a creation stamp assigned to a dependent task is less than or equal to the first task in a pending task queue (step 604). If no, the method 600 may execute the dependent task (step 610). If yes, the method 600 determines if the creation stamp assigned to the dependent task is less than or equal to the minimal creation stamp of a task in a running task list (step 606). If no, again, the method 600 may execute the dependent task (step 610). If yes, the method 600 takes the dependent task for execution (step 608). The method 600 ends (step 612).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system for dependency management in task scheduling in a computing environment, comprising:
    at least one processor operable in the computing environment, wherein the at least one processor is adapted for:
        receiving tasks and labeling each ask with a creation stamp;
        placing each task at the end of a pending task queue, wherein the pending task queue is sorted according to the creation stamp for each task;
        marking a task in the pending task queue as dependent upon preceding tasks;
        deferring the task that is marked and attempted to be taken for execution from a head of the pending task queue by placing it in a deferred task queue if the task that is marked cannot be taken for execution;
        acquiring the deferred task from the deferred task queue and determining if the deferred task may be taken for execution by:
            determining if a creation stamp of a preceding task that is at the head of the pending task queue is greater than the creation stamp of the deferred task that is marked, and
            reinserting the deferred task back into the head of the pending task queue for execution upon determining that the preceding tasks are completed.

2. The system of claim 1, wherein the at least one processor is further adapted for adding to a running tasks list tasks not dependent upon the preceding tasks, wherein the running tasks list includes tasks that are currently being executed and contains a bounded constant that is a maximum allowable number of the tasks that are simultaneously executing.

3. The system of claim 2, wherein the at least one processor is further adapted for executing the tasks in the running tasks list, the executed tasks removed from the running tasks list.

4. The system of claim 3, wherein the at least one processor is further adapted for, if at least one of the tasks in the running tasks list is returned to the pending task queue, performing each one of:
    reinserting the at least one of the tasks into the pending task queue, and
    preserving an original order of the at least one of the task in the pending task queue by a creation stamp of the at least one of the task.

5. The system of claim 1, wherein the at least one processor is further adapted for labeling tasks with a creation stamp by using a non-decreasing function calculation to generate the creation stamp, wherein the creation stamp is a task attribute that will not decrease over time.

6. The system of claim 5, wherein the at least one processor is further adapted for sorting tasks in the pending task queue according to the creation stamp assigned for the labeling.

7. The system of claim 5, wherein the at least one processor is further adapted for, in conjunction with the deferring, ordering the deferred task in the deferred task queue according to the creation stamp assigned for the labeling.

8. The system of claim 1, wherein the at least one processor is further adapted for reinserting the deferred task at the head of the pending task queue for execution if the creation stamp of the preceding tasks that is first in the pending task queue is greater than the creation stamp of the deferred task.

9. The system of claim 1, wherein the at least one processor is further adapted for reinserting the deferred task at the head of the pending task queue for execution if the creation stamp for the task in a running task list is greater than the creation stamp of the deferred task.

10. A computer program product for dependency management in task scheduling in a computing environment using a processor device, the computer program product comprising a non-transitory computer-readable storage medium having computer-readable program code portions stored therein, the computer-readable program code portions to perform the steps of:

receiving tasks and labeling each ask with a creation stamp;

placing each task at the end of a pending task queue, wherein the pending task queue is sorted according to the creation stamp for each task;

marking a task in the pending task queue as dependent upon preceding tasks;

deferring the task that is marked and attempted to be taken for execution from a head of the pending task queue by placing the task in a deferred task queue if the task that is marked cannot be taken for execution;

adding from the pending task queue, tasks not dependent upon preceding tasks to a running task list for execution, wherein the executed tasks are removed from the running task list; and acquiring the deferred task from the deferred task queue and determining if the deferred task may be taken for execution by:

determining if a creation stamp of a preceding task that is at the head of the pending task queue is greater than the creation stamp of the deferred task that is marked, and reinserting the deferred task back into the head of the pending task queue for execution upon determining that the preceding tasks are completed.

11. The computer program product of claim 10, where the running task list includes tasks that are currently being executed and contains a bounded constant that is a maximum allowable number of the tasks that are simultaneously executing.

12. The computer program product of claim 10, further including, if at least one of the tasks in the running tasks list is returned to the pending task queue, performing each one of:

reinserting the at least one of the tasks into the pending task queue, and preserving an original order of the at least one of the task in the pending task queue by a creation stamp of the at least one of the task.

13. The computer program product of claim 10, further including labeling tasks with a creation stamp by using a non-decreasing function calculation to generate the creation stamp, wherein the creation stamp is a task attribute that will not decrease over time.

14. The computer program product of claim 13, further including, in conjunction with the deferring, ordering the deferred task in the deferred task queue according to the creation stamp assigned for the labeling.

* * * * *